(12) United States Patent  
Wheeler et al.

(10) Patent No.: US 9,103,143 B2  
(45) Date of Patent: *Aug. 11, 2015

(54) DOOR HANDLE APPARATUS FOR VEHICLES

(71) Applicant: Tesla Motors, Inc., Palo Alto, CA (US)

(72) Inventors: David Wheeler, San Carlos, CA (US); Adam S. Kilgore, San Francisco, CA (US); Scott P Cromwell, Mountain View, CA (US); Daryl J. Zalan, San Francisco, CA (US); Robert E. Mooney, Mountain View, CA (US); Peter Dore Rawlinson, Worcestershire (GB); Alan Paul Clarke, Redondo Beach, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 413 days.

This patent is subject to a terminal disclaimer.

(21) Appl. No.: 13/626,864

(22) Filed: Sep. 25, 2012

(65) Prior Publication Data

US 2013/0076047 A1    Mar. 28, 2013

Related U.S. Application Data

(60) Provisional application No. 61/539,203, filed on Sep. 26, 2011, provisional application No. 61/539,337, filed on Sep. 26, 2011, provisional application No. 61/539,499, filed on Sep. 27, 2011, provisional application No. 61/539,580, filed on Sep. 27, 2011.

(51) Int. Cl.
*E05B 3/00* (2006.01)
*E05B 85/10* (2014.01)
*E05B 5/02* (2006.01)

(Continued)

(52) U.S. Cl.
CPC ............. *E05B 85/103* (2013.01); *E05B 1/0092* (2013.01); *E05B 5/003* (2013.01); *E05B 5/006* (2013.01); *E05B 85/18* (2013.01);

(Continued)

(58) Field of Classification Search
CPC ........ E05B 5/003; E05B 5/006; E05B 1/0092
USPC ....................... 292/336.3, DIG. 31
See application file for complete search history.

(56) References Cited

U.S. PATENT DOCUMENTS 2,017,244 A * 10/1935 Gudmundsen .................. 16/200
5,123,687 A *  6/1992 Pfeiffer et al. ............. 292/336.3

(Continued)

FOREIGN PATENT DOCUMENTS

DE      19833168 A1 *  2/2000      ............ E05B 65/20
GB         453333    *  9/1936
SE       521632 C2    11/2003

*Primary Examiner* — Carlos Lugo

(74) *Attorney, Agent, or Firm* — J. Richard Soderberg

(57) ABSTRACT

A door handle assembly extends a door handle in parallel from an outer surface of a vehicle door and retracts the door handle until it is flush with the outer surface. The door handle assembly includes a door handle formed from a planar handle member and a handle base member. The planar handle member is coupled to the handle base member and a swing arm coupled to the backside of the handle base member extends and retracts the door handle. A first upper fork is rotably coupled to a backside of the handle base member near the distal portion of a first post portion and a second upper fork is rotably coupled to the backside of the handle base member near the distal portion of a second post portion. The lower dual fork portion of the swing arm pivots about a shaft mounted to an inner door surface.

17 Claims, 7 Drawing Sheets

(51) Int. Cl.
  *E05B 1/00*     (2006.01)
  *E05B 85/18*    (2014.01)
  *E05B 5/00*         (2006.01)
  *E05B 79/06*        (2014.01)
  *E05B 81/00*        (2014.01)

(52) U.S. Cl.
  CPC ............... *E05B 79/06* (2013.01); *E05B 81/00* (2013.01); *E05B 85/107* (2013.01)

(56) References Cited

U.S. PATENT DOCUMENTS

| | | | |
|---|---|---|---|
| 5,305,969 A * | 4/1994 | Odell et al. | 244/129.5 |
| 5,632,516 A * | 5/1997 | Schwab | 292/336.3 |
| 5,844,470 A * | 12/1998 | Garnault et al. | 340/5.62 |
| 6,062,614 A * | 5/2000 | Petzold | 292/336.3 |
| 6,072,403 A * | 6/2000 | Iwasaki et al. | 340/5.72 |
| 6,094,131 A | 7/2000 | Chen et al. | |
| 6,429,782 B2 * | 8/2002 | Pavatich et al. | 340/686.6 |
| 6,698,262 B2 * | 3/2004 | Wittwer | 70/208 |
| 6,843,084 B2 * | 1/2005 | Porter | 70/208 |
| 7,445,257 B2 | 11/2008 | Muller et al. | |
| 7,621,573 B2 | 11/2009 | Thomas et al. | |
| 8,047,583 B2 * | 11/2011 | Clausen | 292/336.3 |
| 8,403,265 B2 * | 3/2013 | Gowing et al. | 244/129.5 |
| 8,443,553 B1 * | 5/2013 | Polewarczyk et al. | 49/503 |
| 8,701,353 B2 * | 4/2014 | Patel et al. | 49/503 |
| 8,733,815 B2 * | 5/2014 | Kwon | 296/50 |
| 8,833,190 B2 * | 9/2014 | Hsu et al. | 74/89 |
| 8,919,047 B2 * | 12/2014 | Johnsrud et al. | 49/503 |
| 2003/0182863 A1 | 10/2003 | Mejean et al. | |
| 2004/0177478 A1 | 9/2004 | Louvel | |
| 2007/0126246 A1 | 6/2007 | Suzuki et al. | |
| 2008/0021619 A1 | 1/2008 | Steegmann et al. | |
| 2008/0061933 A1 * | 3/2008 | Ieda et al. | 340/5.72 |
| 2008/0163555 A1 * | 7/2008 | Thomas et al. | 49/460 |
| 2008/0290668 A1 | 11/2008 | Ieda et al. | |
| 2008/0314097 A1 | 12/2008 | Rohlfing et al. | |
| 2009/0039671 A1 * | 2/2009 | Thomas et al. | 296/146.1 |
| 2009/0243319 A1 * | 10/2009 | Browne et al. | 296/1.02 |
| 2010/0127516 A1 * | 5/2010 | Fannon | 292/336.3 |
| 2011/0018056 A1 | 1/2011 | Takeuchi | |
| 2011/0148575 A1 | 6/2011 | Sobecki et al. | |
| 2012/0119524 A1 | 5/2012 | Bingle et al. | |
| 2013/0076048 A1 * | 3/2013 | Aerts et al. | 292/336.3 |
| 2013/0127185 A1 * | 5/2013 | Lang et al. | 292/336.3 |
| 2013/0147213 A1 | 6/2013 | Muller et al. | |
| 2014/0022811 A1 * | 1/2014 | Wheeler et al. | 362/555 |
| 2014/0069015 A1 | 3/2014 | Salter et al. | |

* cited by examiner

DOOR HANDLE APPARATUS FOR VEHICLES

CROSS-REFERENCE TO RELATED APPLICATIONS

This application claims the benefit of: (1) U.S. Provisional Application No. 61/539,203, filed Sep. 26, 2011, entitled, "DOOR RELEASE LATCH UTILIZING A CAPACITIVE SENSOR" by Wheeler et, al, (2) U.S. Provisional Application No. 61/539,337, filed Sep. 26, 2011, entitled, "SINGLE SOURCE DUAL PURPOSE, VEHICLE DOOR HANDLE ILLUMINATOR" by Wheeler et. al, (3) U.S. Provisional Application No. 61/539,499, filed Sep. 27, 2011, entitled, "ELECTRO-MECHANICAL SWITCH ASSEMBLY FOR EXTERIOR VEHICLE DOOR HANDLE" by Wheeler et. al, (4) U.S. Provisional Application No. 61/539,580, filed Sep. 27, 2011, entitled, "SELF-DEPLOYING OUTSIDE DOOR HANDLE" by Wheeler et. al, assigned to the assignee of this application and incorporated by reference herein for all purposes. Each of the above-referenced patent applications is incorporated by reference herein for all purposes.

TECHNICAL FIELD

The subject matter described herein relates to the features used on a vehicle and more particularly to an exterior door handle for use on a vehicle door.

DESCRIPTION OF THE RELATED ART

Most modern vehicles require some type of exterior door handle to open and close the vehicle doors. The exterior door handle is mounted over a recessed area in the door creating a finger opening or place to insert one's hand while unlocking and opening the door. The conventional exterior door handle spans this recessed area in the door and incorporates a mechanical hinge, a paddle, or other mechanical actuator to engage the latch and open the door. As the exterior door handle pivots on the mechanical actuator, the door latch mechanism for the vehicle door is actuated causing the door to unlatch and open.

Conventional door handle designs typically have less than desirable aerodynamics due to protrusion of the exterior door handle from the surface of the door and the recessed area over which it spans. As the vehicle moves, these conventional door handles interrupt the smooth surface of the door and thereby increase the overall drag of the vehicle. Depending on the size, depth, and overall shape of the recessed area, for example, the corresponding area under the door handle further contributes to reduced aerodynamics of the vehicle. Designers have not focused on improving aerodynamics in this area as the exterior door handle seems relatively small and inconsequential.

SUMMARY

Aspects of the disclosure provide a door handle assembly that extends a door handle in a parallel manner from an outer surface of a vehicle door and retracts the door handle, also in parallel manner, until it is flush to the surface of the vehicle door. In some embodiments, the door handle assembly used in a vehicle door includes a door handle formed from a planar handle member and a handle base member. The planar handle member has a first post portion and a second post portion fixedly coupled to the handle base member at a distal portion of the first post portion and a distal portion of the second post portion. To extend and retract the door handle, a swing arm is coupled to the backside of the handle base member. A first upper fork from an upper dual fork portion of the swing arm is rotably coupled to a backside of the handle base member near the distal portion of the first post portion. Likewise, a second upper fork from the upper dual fork portion is rotably coupled to the backside of the handle base member near the distal portion of the second post portion. The lower dual fork portion of the swing arm is rotably attached to a shaft mounted to an inner door surface of the vehicle door.

DETAILED DESCRIPTION

In the following detailed description, for purposes of explanation, numerous specific details are set forth to provide a thorough understanding of the various embodiments of the disclosure. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming but would nevertheless be a routine engineering undertaking for those of ordinary skill in the art having the benefit of this disclosure.

Figure 1A:
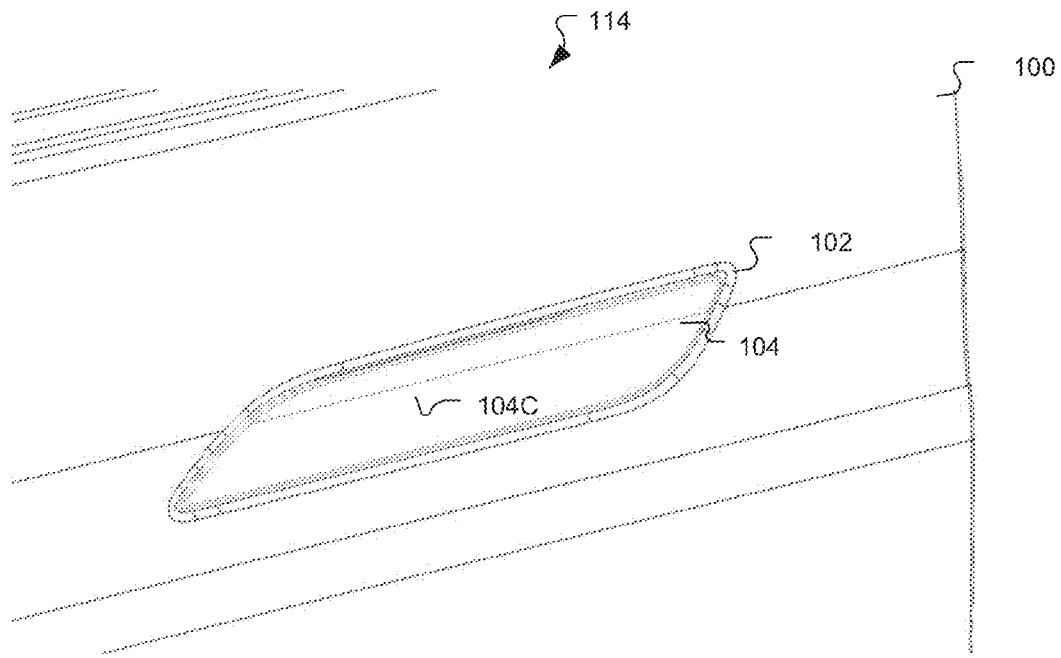
FIG. 1A-1B provides an exterior view of a vehicle door portion with a door handle in both a retracted position and extended position in accordance with some embodiments.
Figure 1B:
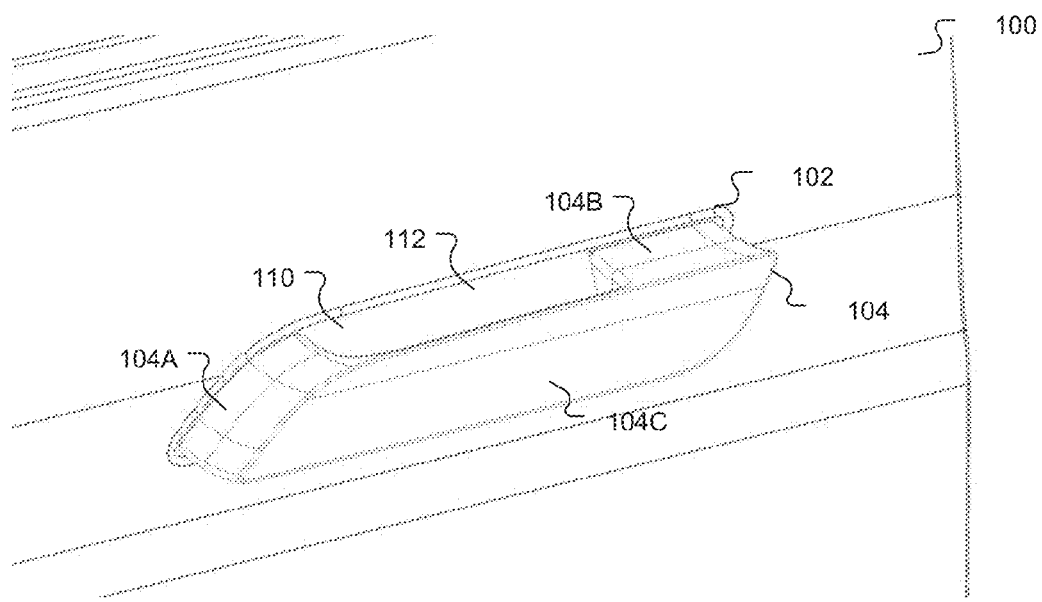
Figure 2:
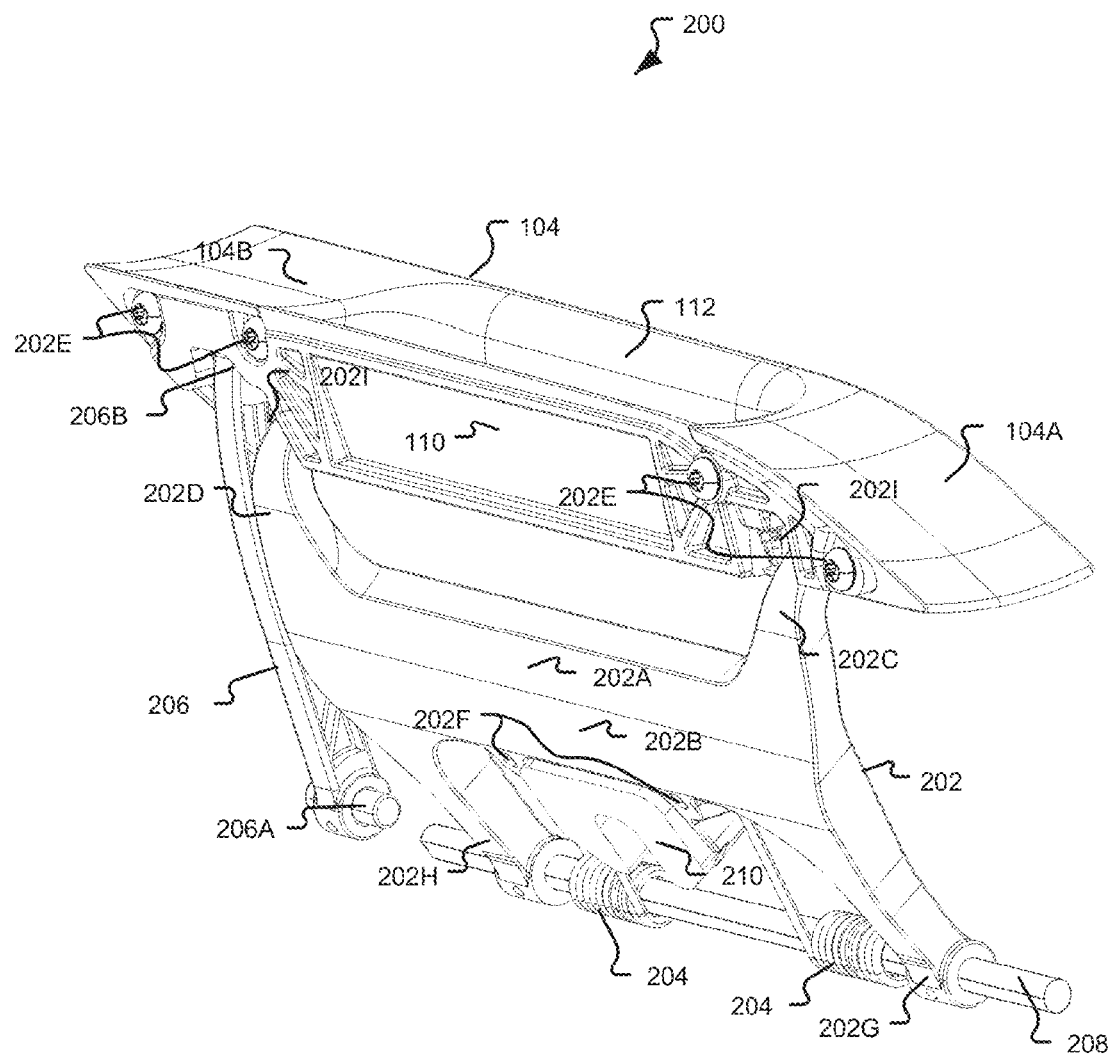
FIG. 2 provides a perspective view of a door handle assembly from an interior perspective in accordance with some embodiments.
Figure 3A:
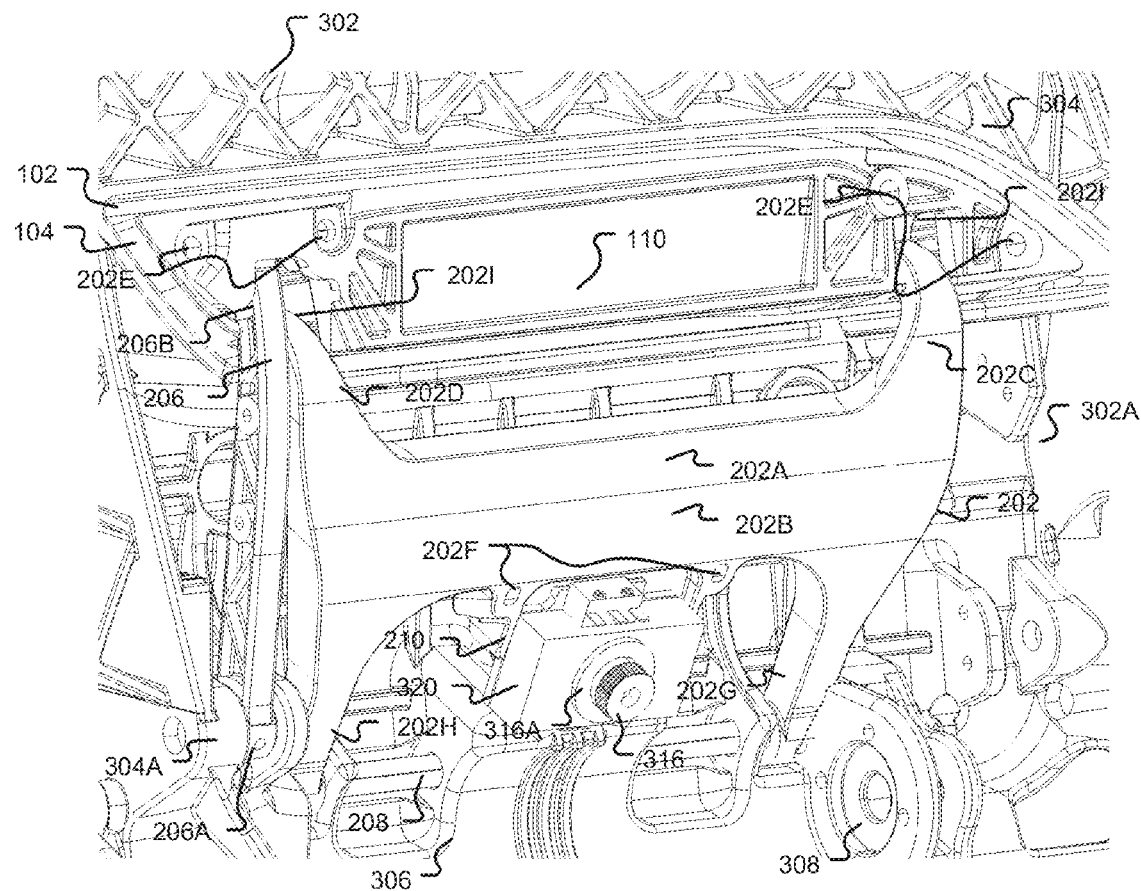
FIG. 3A-3B provides additional perspective views of a door handle assembly installed in a door handle tray and attached to an inner door surface of a door in accordance with some embodiments.
Figure 3B:
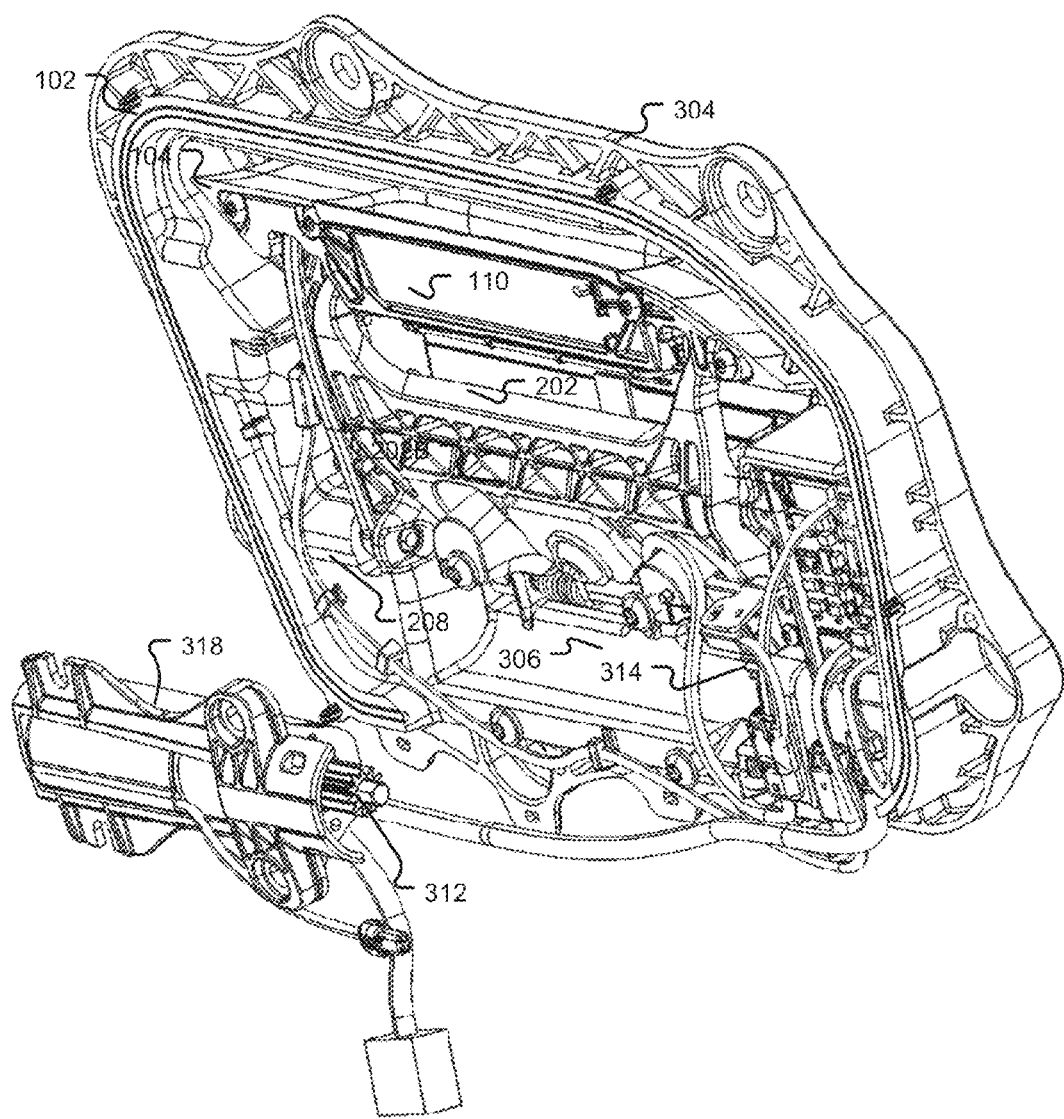
Figure 4:
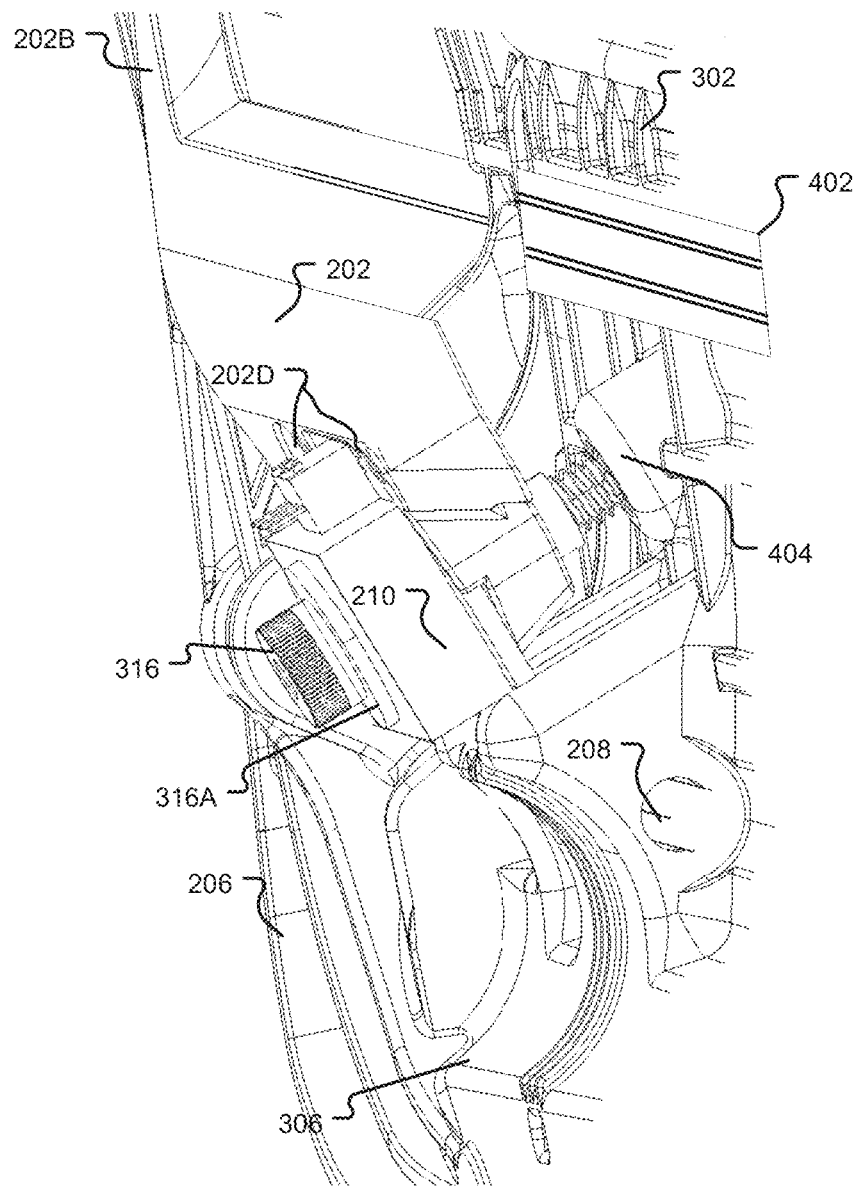
FIG. 4 provides a cross-sectional side view of a door handle assembly exposing a min extension request sensor and a max extension sensor in accordance with some embodiments.

Referring to FIG. 1A-1B, a door handle in both a retracted and extended position in accordance with some embodiments is provided along with an exterior view of a vehicle door portion. The vehicle door portion 114, as illustrated, has an outer door surface 100 and a handle aperture 102 that door handle 104 passes through. In some embodiments, the handle aperture 102 in the vehicle door may be formed using a sleeve fitted through the vehicle door. Alternate embodiments may instead incorporate handle aperture 102 directly into the material used to manufacture the vehicle door.

In the retracted position depicted in FIG. 1A, a planar handle member 104C of the door handle 104 is flush with the outer door surface 100 and has an outside shape that fits handle aperture 102. Keeping door handle 104 in the retracted position provides both a smooth appearance and advantageous aerodynamic qualities when the vehicle is in motion. When the vehicle is stopped or operating at a relatively slow speed, door handle 104 may be extended, or deployed, with planar handle member 104C moving in a parallel manner from outer door surface 100 to a predetermined height, typically corresponding to the height of first post portion 104B or second post portion 104A of planar handle member 104G.

To further enhance the overall comfort, safety, and appearance, some embodiments of door handle 104 are formed by coupling a handle base member 110 to planar handle member 104C at the distal portions of first post portion 104B and second post portion 104A. In the deployed state, planar surface of handle base member 110 extending between first post portion 104B and second post portion 104A may also be substantially flush with surrounding areas of outer door surface 100. The resulting smooth contiguous surface presented as a hand is inserted in the wrapped handle grip 112 engenders quality and integrity, both visually and practically, in the operation of door handle 104 and the vehicle to which it is attached.

To give the door handle 104 the appearance of gradually floating into position, several different subcomponents or assemblies are used under the direction of a combination of one or more controllers as depicted and described in FIGS. 2, 3A, 3B, 4, 5A, 5B, and 6. The subcomponents in some embodiments include a door assembly 200, a handle assembly tray 304, and an inner door assembly aperture 302A portion of the inner door surface 302. For example, door assembly 200 may be installed inside handle assembly tray 304 before the handle assemble tray 304 is then mounted in an opening in the inner door, the inner door assembly aperture 302A. The modular design of handle assembly tray 304 facilitates cost-effective manufacture and allows selective use of stiffening materials in handle assembly tray 304, rather than the entire inner door surface 302, to enhance the overall precision and alignment of door assembly 200 when it is installed. Once mounted, the handle assembly tray 304 holding the door assembly 200 becomes integral to the inner door surface 302 and the vehicle door as a whole. Accordingly, in alternate embodiments portions of inner door surface 302 may be designed to directly receive door assembly 200, this would obviate using handle assembly tray 304 to install door assembly 200 as a module separate from the vehicle door.

By securely attaching handle base member 110 to door handle 104 with handle fasteners 202E, both the door handle 104 and handle base member 110 move together when urged by a swing arm 202. Swing arm 202 in one embodiment has both an upper dual fork portion 202A and a lower dual fork portion 202B, and may be referred to as a "swan neck fork" arm due to the widely spaced arcuate forks. In this embodiment, the shape of each arcuate fork and the width between forks provide a stiffness that reduces torsional displacement and linear deflection when the door handle 104 is used. As the term "arcuate" refers to all or portions of a circular line, it is contemplated that the arcuate shapes of dual forks in upper dual fork portion 202A and lower dual fork portion 202B, as well as the width between each fork, may be modified depending on the particular shape of the door and other implementation details.

From upper dual fork portion 202A, a first upper fork 202C is rotably coupled to a backside of handle base member 110 near the distal portion of the second post portion 104A. Likewise, a second upper fork 202D from the upper dual fork portion 202A is also rotably coupled to the backside of the handle base member 110 near the distal portion of the first post portion 104B. In some implementations, both second upper fork 202D and first upper fork 202C fit into slotted openings 202I within handle base member 110. A smaller shaft passes through axial openings in the walls of each slotted opening 202I and the ends of each upper dual fork portion 202A, this enables the door handle 104 and handle base member 110 to pivot about the upper portion of swing arm 202.

In some embodiments, lower dual fork portion 202B pivots about a shaft 208 slidably inserted through corresponding axial openings in handle assembly tray 304. If an assembly tray 304 is not utilized to mount door handle assembly 200, shaft 208 may alternatively be axially attached through openings made directly in the inner door surface 302. In either embodiment, once the lower dual fork portion 202B is rotably attached to shaft 208, pivoting of the swing arm 202 also results in movement of the door handle 104 and handle base member 110. In particular, as the swing arm 202 pivots around shaft 208, the upper dual fork portion 202A of the swing arm 202 moves portions of door handle 104 between outer door surface 100 and inner door surface 302. For example, moving the swing arm 202 towards the inner door surface 302 causes door handle 104 to extend through handle aperture 102, this positions the door handle 104 above the outer door surface 100. Conversely, moving the swing arm 202 away from the inner door surface 302 urges the door handle 104 to retract through the handle aperture 102, this eventually results in retracting the planar handle member 104C until it is flush with the outer door surface 100.

As the door handle 104 extends and retracts through handle aperture 102, control arm 206 keeps its motion along a parallel direction. The precision and predictability of this parallel motion compliments the overall design and further engenders an impression of reliability, integrity, and craftsmanship of the vehicle handle 104 and the vehicle in which it used. The parallel motion of the door handle 104 also helps accommodate a tight packaging requirement within the door while providing a wrapped handle grip 112 with adequate clearance for fingers and a hand. Within the interior of the car door, for example, the swing arm 202 can retract door handle 104 without damaging a retracted window of the car door. In some embodiments, an upper control arm pivot 206B rotably connected to the backside of the handle base member 110 is positioned off-axis to the rotably coupled second upper fork 202D. Similarly, a corresponding lower control arm pivot 206A is rotably connected to the inner door surface 302 of the vehicle door and positioned off-axis to the rotably coupled second lower fork 202H. Combined together, the off-axis positioning of control arm 206 relative to swing arm 202 creates a four-bar link for controlling motion of door handle 104. In one embodiment, the control arm 206 controls the longitudinal rotation of the vehicle handle 104 and constrains the vehicle handle 104 movement along a parallel direction from outer door surface 100.

A biasing member 204, implemented in some embodiments with springs, operates to urge door handle 104 into a retracted position flush with the outer door surface 100. Coiled portions of the springs from biasing member 204 are wrapped around shaft 208 while tails of the springs are inserted into spring insertion points 202F. While the force imparted by biasing member 204 urges the swing arm 202 to retract, it is not strong enough to pinch or hurt a hand inserted into wrapped handle grip 112 of door handle 104. Consequently, if a hand is inside wrapped handle grip 112, biasing member 204 may partially retract the door handle 104 towards the inner door surface 302 stopping when the person's hand meets the handle aperture 102.

To extend the vehicle handle 104, one embodiment of door handle assembly 200 utilizes a handle motor 318 and various drive components. A motor mount 306 in the door handle assembly 200 receives the handle motor 318 with a drive shaft passing through motor shaft opening 308. Drive gear 312 is axially mounted on the drive shaft and, when positioned in drive gear slot 310, engages with and meshes to gears from a paddle gear 314. By mounting paddle gear 314 about shaft 208 and rotating handle motor 318 in a first direction, the gears are advanced and the opposing face of the paddle, at the distal end, slidably engages first lower fork 202G. The force imparted upon first lower fork 202G overcomes the opposing force from biasing member 204 thus urging swing arm 202 towards the inner door surface 302 and moving door handle 104 into an extended position.

In some embodiments, the handle motor 318 stops rotating in the first direction when the upper dual fork portion 202A applies pressure to extension sensor 402, this condition indicates the door handle 104 is fully extended. To keep the vehicle handle in this extended position, a handle controller 616 monitoring extension sensor 402 instructs the handle motor 318 to stop rotating in the first direction. Planetary gears incorporated in handle motor 318 resist retracting vehicle handle 104, even under the force imparted from biasing member 204.

The handle controller 616 may subsequently instruct handle motor 318 to rotate in the second direction, opposite the first rotational direction, thereby overcoming the torque of the planetary gears and allowing biasing member 204 to retract vehicle handle 104. The chance of pinching fingers or hands in wrapped handle grip 112 is reduced as the flat side of paddle gear 314 drops away from first lower fork 202G and only the force of biasing member 204 retracts vehicle handle 104. The handle controller 616 instructs the handle motor 318 to stop rotating in the second direction when the lower dual fork portion 202B applies sufficient pressure on retraction sensor 320, this condition indicates the door handle 104 is fully retracted. In various embodiments, extension sensor 402 and retraction sensor 320 may be implemented using a variety of mechanical, electromechanical, solid-state, magnetic, nano-particle, piezo-electric based technologies capable of detecting a force, a change in force, a distance traveled, a change in electrical resistance, deformation or other events producing results that may be detected and processed by handle controller 616.

Retraction sensor 320 is fixedly mounted on a sensor flange 210 located between the first lower fork 202G and second lower fork 202H of lower dual fork portion 202B. In some embodiments, placing sensor flange 210 and retraction sensor 320 equidistant from the first lower fork 202G and second lower fork 202H helps maintain even pressure on retraction sensor 320. A flush adjuster rod 316 placed through a longitudinal slot or aperture in retraction sensor 320 limits how far swing arm 202 may retract. The flush adjuster rod 316 passes through both retraction sensor 320 and sensor flange 210 into a threaded opening 404 of the inner door surface 302. The size of annular flange 316A is sufficiently large to evenly distribute force from swing arm 202 over the face of retraction sensor 320. Some embodiments may integrate the annular flange 316A into the top of flush adjuster rod 316 or by axially sliding a washer or gasket into place over the flush adjuster rod 316. To fit door assembly 200 into a vehicle door during manufacture, the flush adjuster rod 316 is axially adjusted against the force of biasing member 204 until the surface of planar handle member 104C is flush with the outer door surface 100.

Figure 6:
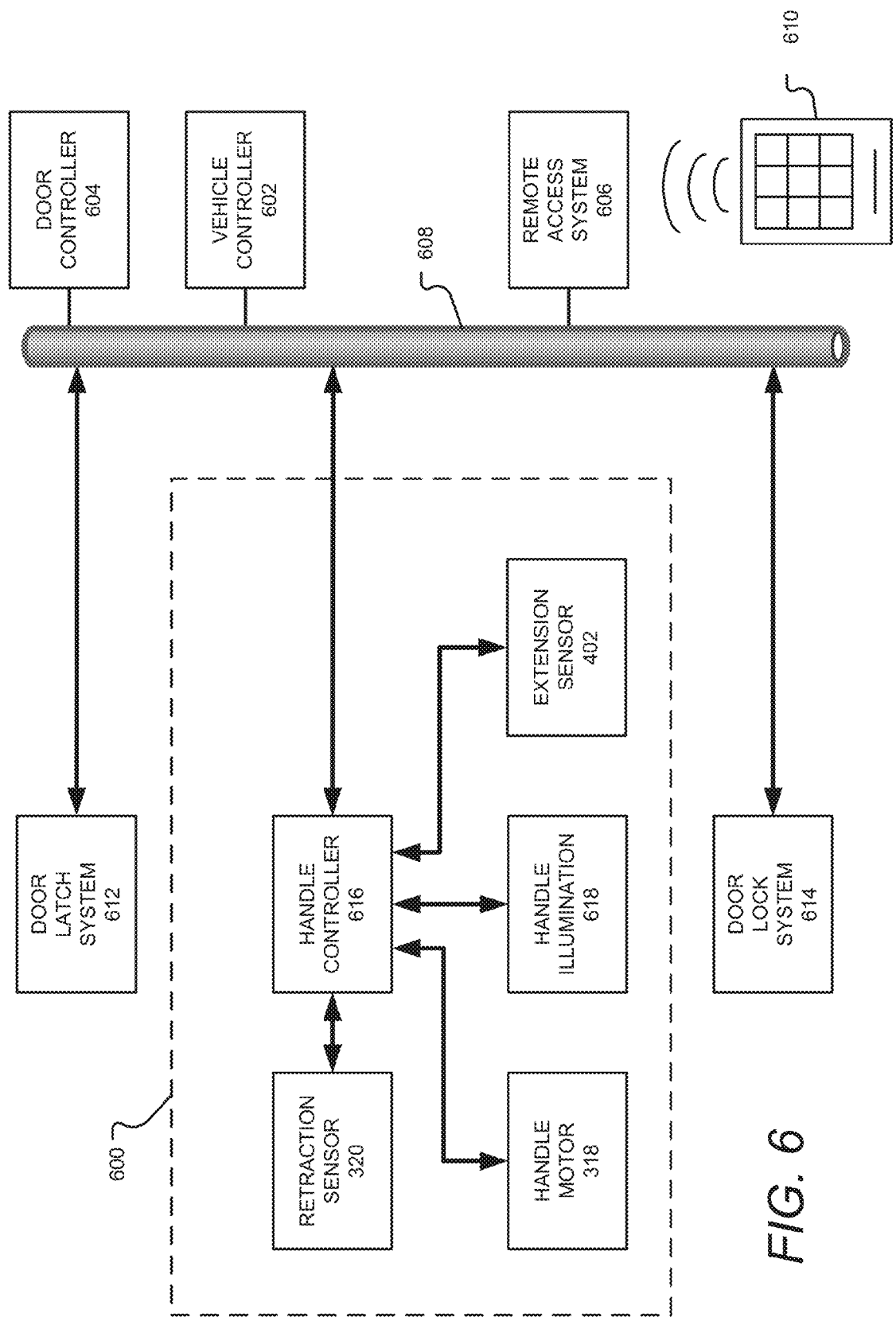
FIG. 6 schematically illustrates systems and electronics supporting operation of a door handle assembly in accordance with some embodiments.

FIG. 6 schematically illustrates systems and electronics supporting operation of a door handle assembly 200 in accordance with some embodiments. As illustrated, these systems may include door handle system 600, a vehicle controller 602, a door controller 604, a remote access system 606, a wireless controller 610, a door latch system 612, and a door lock system 614. In one embodiment, door handle system 600 operates door handle 104 while door controller unit 604 actuates door latch system 612 and/or door lock system 614.

The door handle system 600 in one embodiment includes retraction sensor 320, handle motor 318, extension sensor 402, handle controller 616, and handle illumination 618. Typically, handle controller 616 receives sensor data from retraction sensor 320 or extension sensor 402 then uses the results to determine whether to extend or retract the door handle 104. Handle controller 402 may also use vehicle status information from door controller 604 and vehicle controller 602 in determining when to extend or retract door handle 102. For example, if vehicle controller 602 indicates a vehicle is moving, then door handle system 600 may not extend door handle 104. In general, handle controller 616, door controller 604, and vehicle controller 602 may include one or more embedded or general purpose processors running a variety of software or firmware configured to control door handle 104 and operation of other various portions of the vehicle.

Figure 5A:
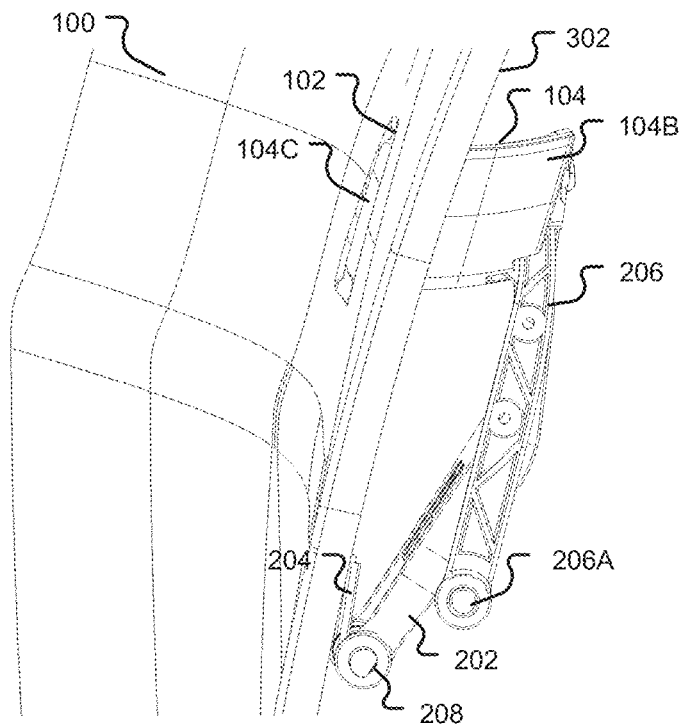
FIG. 5A-B provides a perspective side view of a vehicle door and portions of a door handle assembly with a door handle in both a retracted and an extended position in accordance with some embodiments.

When door handle 104 is retracted as illustrated in FIG. 5A, a user's hand may push inward on planar handle member 104C causing retraction sensor 320 to send a signal requesting to extend vehicle handle 104. Before fulfilling the request to extend, handle controller 616 may communicate with vehicle controller 602 to check vehicle status and get authorization to extend door handle 104. For example, vehicle controller unit 602 may authorize extending door handle 104 if the vehicle is not moving and the person pushing on the door handle 104 possesses a proper wireless controller 610 such as a key fob. In some embodiments, vehicle controller 602 may further check with remote access system 606 to make certain this latter condition is met before authorizing handle controller 616 to operate handle rotor 318 and extend door handle 104 as previously described.

Figure 5B:
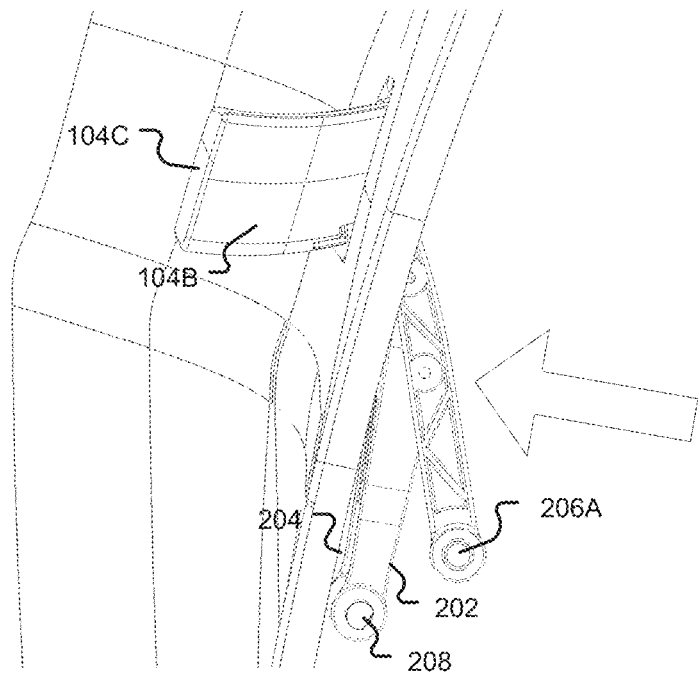

In the event door handle 104 is extended as depicted in FIG. 5B, a user's hand may pull on wrapped handle grip 112 causing extension sensor 402 to send a signal corresponding to a request to unlatch the vehicle door. Instead of fulfilling this request immediately, one embodiment of handle controller 616 forwards the request to unlatch the vehicle door to vehicle controller unit 602. Vehicle controller unit 602, in turn, may authorize door controller 604 to unlatch the vehicle door if the vehicle is not moving and the person pulling on the door handle 104 possesses the proper wireless controller 610 or key fob as determined by remote access system 606.

While specific embodiments have been described herein for purposes of illustration, various modifications may be made without departing from the spirit and scope of the disclosure. For example, while several discrete controllers such as handle controller 616, door controller 604, and vehicle controller 602 are described, it is possible that these controllers could be implemented using fewer controllers by combining the functionality of the controllers together or by using a greater number of controllers by dividing the functionality of the controllers over additional controllers. Further, some embodiments may incorporate an electronic lock into a door latch system thus obviating the need for two discrete systems such as the door latch system 612 and the door lock system 614. If the door lock system 614 were combined into the door latch system 612, the status of an electronic lock or B-lock portion of the door latch system 612 would be considered before the door latch system 612 would allow a latch to be opened. Accordingly, the disclosure is not limited to the above-described implementations, but instead is defined by the appended claims in light of their full scope of equivalents.

What is claimed is:

1. A door handle assembly used in a vehicle door, comprising:
   a door handle formed from a planar handle member having a first post portion and a second post portion fixedly coupled to a handle base member at a distal portion of the first post portion and a distal portion of the second post portion;
   a motor; and
   a swing arm having a upper dual fork portion and a lower dual fork portion with a first upper fork from the upper dual fork portion rotatably coupled to a backside of the handle base member near the distal portion of the first post portion and a second upper fork from the upper dual fork portion rotatably coupled to the backside of the handle base member near the distal portion of the second post portion, the lower dual fork portion rotatably attached to a shaft mounted to an inner door surface of the vehicle door, wherein extending the swing arm positions the door handle in an extended position from an outer door surface of the vehicle door and retracting the swing arm urges the planar handle member in the extended position to pass through a handle aperture of the vehicle door until the planar handle member is flush to the outer door surface of the vehicle door, wherein at least one of extending and retracting the swing arm is performed using the motor.

2. The door handle assembly of claim 1 wherein the planar handle member combined with the handle base member of the door handle forms a wrapped handle grip.

3. The door handle assembly of claim 1 wherein the handle aperture corresponds to an outside shape of the planar handle member.

4. The door handle assembly of claim 3 wherein the handle aperture of the vehicle door is formed with a sleeve fitted through the vehicle door.

5. The door handle assembly of claim 3 wherein the handle aperture of the vehicle door is incorporated into the vehicle door.

6. The door handle assembly of claim 1 wherein the lower dual fork portion of the swing arm pivots around the shaft and causes the upper dual fork portion of the swing arm to move the door handle between the outer door surface of the vehicle door and the inner door surface of the vehicle door.

7. The door handle assembly of claim 6 wherein the shaft has a biasing member that urges the swing arm pivoting around the shaft to retract the door handle through the handle aperture towards the inner door surface of the vehicle door.

8. The door handle assembly of claim 7 wherein the biasing member is a spring.

9. The door handle assembly of claim 1 further including a handle extension sensor fixedly mounted on a flange of the swing arm between a first lower fork and a second lower fork and having a longitudinal slot to receive a flush adjuster rod, wherein the flush adjuster rd passing through the longitudinal slot and into a threaded opening of the inner door surface is axially adjustable against a force of the biasing member to position the planar handle member flush with the outer door surface of the vehicle door.

10. The door handle assembly of claim 1 further including a control arm having an upper pivot rotatably connected to the backside of the handle base member off-axis to the rotatably coupled second upper fork and a lower pivot rotatably connected to the inner door surface of the vehicle door off-axis to a rotatably coupled first lower fork, the control arm operating to guide the door handle in a parallel direction as the door handle passes through the handle aperture.

11. The door handle assembly of claim 10, wherein the control arm and the swing arm form a four-bar link.

12. The door handle assembly of claim 7, wherein retracting the swing arm is performed using the biasing member.

13. The door handle assembly of claim 12, wherein extending the swing arm is performed using the motor.

14. The door handle assembly of claim 1, further comprising a handle assembly tray configured for being mounted to the inner door surface, wherein the door handle, the motor and the swing arm are installed in the handle assembly tray.

15. The door handle assembly of claim 1, wherein the swing arm is a swan neck fork arm, and wherein each of the upper and lower dual fork portions is an arcuate fork.

16. The door handle assembly of claim 1, wherein the first and second upper forks fit into respective slotted openings in the handle base member.

17. The door handle assembly of claim 1, further comprising a paddle gear configured to engage the swing arm, wherein the paddle gear is mounted to the motor.

* * * * *